UNITED STATES PATENT OFFICE.

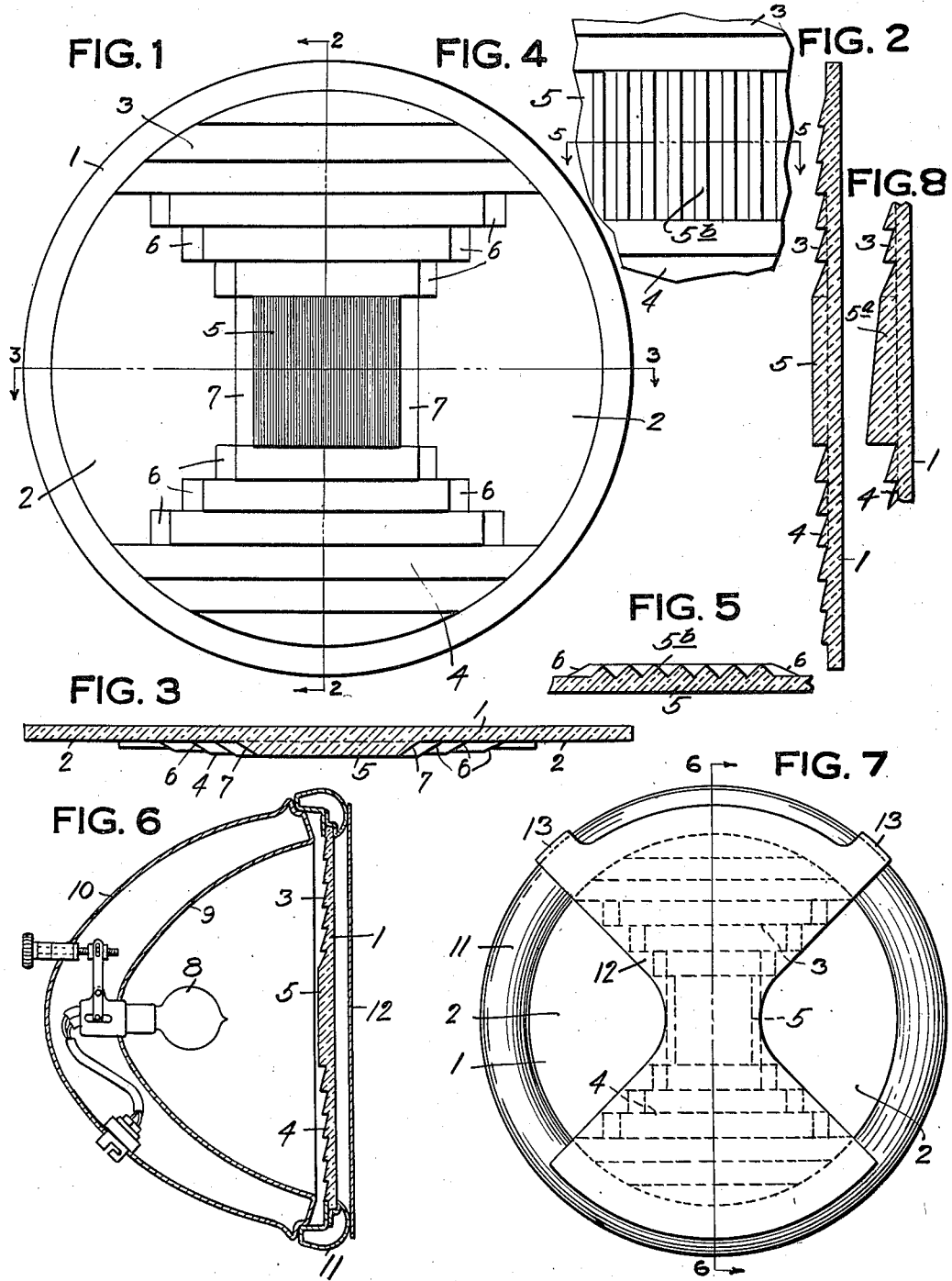

LARS O. GRONDAHL, OF PITTSBURGH, PENNSYLVANIA.

HEADLIGHT LENS.

1,414,125.  Specification of Letters Patent.  Patented Apr. 25, 1922.

Continuation of application Serial No. 357,582, filed February 10, 1920. This application filed March 18, 1921. Serial No. 453,413.

*To all whom it may concern:*

Be it known that I, LARS O. GRONDAHL, a citizen of the United States, and resident of Pittsburgh, in the county of Allegheny and State of Pennsylvania, have invented a new and useful Improvement in Headlight Lenses; and I do hereby declare the following to be a full, clear, and exact description thereof.

My invention relates to lenses for automobile headlights or for other purposes to which it may be applicable.

One of the objects of my invention is to provide an automobile headlight having means for definitely indicating when the headlight is properly adjusted, focused and directed, thus enabling the proper adjustment, focusing and directing to be accomplished without removing the lens from the headlight.

Another object of my invention is to eliminate the glare of the headlight and to produce proper distribution of the light, both forward and sidewise.

A further object of my invention is to provide sufficient diffused illumination near the vehicle, as distinguished from the illumination of the road at a distance.

With these and other related objects in view, my invention consists in an improved lens construction, together with a screen or the like which enables one to adjust the focus and direction of the headlight beam without removing the lens.

In the accompanying drawing, Fig. 1 is an elevational view showing the general appearance of the lens, this view being taken from the interior of the headlight; Fig. 2 is a vertical sectional view taken substantially along the line 2—2, Fig. 1; Fig. 3 is a horizontal sectional view taken substantially along the line 3—3 Fig. 1; Fig. 4 is a fragmentary elevational view showing a modified form of the central portion of the lens; Fig. 5 is a horizontal sectional view taken substantially along the line 5—5, Fig. 4; Fig. 6 is a longitudinal vertical sectional view taken centrally through an automobile headlight provided with my improved lens, and also provided with a focusing screen; Fig. 7 is a front elevational view of the headlight and screen shown in Fig. 4; and Fig. 8 is a fragmentary sectional view showing a modified form of the construction of Fig. 2.

An automobile headlight, in order to function properly, must direct most of its light rays downward and forward, since the bright illumination of the road is its main purpose. In addition, the headlight should so direct its rays as not to dazzle the eyes of pedestrians or the drivers of other vehicles, and it is an advantage to provide for directing a portion of the light sidewise in order to illuminate the sides of the road and to give sufficient light for turning corners. There should also be sufficient light, preferably of a diffused nature, near the car itself.

My present invention aims to provide a lens which shall properly direct the rays of the headlight and by means of which the headlight may be correctly focused and directed without removing the lens from the headlight. The latter object is accomplished, in spite of the confusing effect of the prisms or other light modifying elements of the lens, by means of one or more focusing areas which are either left plain or slightly prismatic, together with means for isolating the light rays passing through the focusing areas.

My improved lens fulfills all of the above requirements through four distinct kinds of light-transmitting portions. First, I provide focusing areas either of plain or simply prismatic glass upon the portions of the lens where the vertical divergence of the light rays is small, these areas being termed "adjusting areas" or "focusing areas." Second, I provide horizontal prisms of various angles upon the portions of the lens where it is necessary to deflect some of the rays downward, the angles of the prisms being suitably selected for this purpose. Third, I provide vertical prisms upon certain portions of the lens for deflecting a part of the light rays sidewise; and, fourth, I provide in the center of the lens a diffusing area having a roughened or coated surface to provide for diffused illumination near the car. In a modified form of my lens, the central area is provided with vertical prisms on its whole surface to provide for a greater sidewise dispersion of the light.

Referring to the drawing, the lens 1 comprises side portions 2 of plain or simply prismatic glass, upper and lower groups of horizontal prisms 3 and 4, and a rectangular central portion 5, the surface of which is roughened, coated or otherwise modified, in order that the light passing through this area shall be diffused. The ends of each of the prisms 3 and 4 are beveled, as shown at 6, to provide small vertical prisms which produce sidewise deflection of a small part of the light rays. Other vertical prisms 7 are provided at the sides of the diffusion area 5, and the prisms 7 may be raised above the level of the surfaces 2 and 5 or may form a continuation of the surface 5, in which case the surface 5 is made of the combined thickness of the surface 2 and the prisms 7. The latter construction is shown in Figs. 2, 3 and 4. The areas 2, instead of being perfectly plain, may be made slightly prismatic to deflect the light downward. This downward reflection, however, is preferably less than the deflection produced by the horizontal prisms 3 and 4, in order that the beams of light passing through the areas 2 may be distinguished when focusing the headlight lamp in the manner described below.

The angles given to the prisms 3 and 4 will be determined by the amount of deflection and concentration which it is desired to impart to the light rays. Since these angles will vary for different cases, I do not wish to be limited to the angles which, for the purpose of illustration, are shown in the drawing.

In order to cause the light passing through the central portion 5 to be mainly directed downward, I may make this central portion in the form of a single large horizontal prism, as indicated at 5ª on Fig. 8. Figs. 4 and 5 show another modified form which may be given to the central portion 5, wherein the whole surface of the portion 5 is covered with vertical prisms 5ᵇ.

Fig. 6 shows my improved lens as applied to an automobile headlight comprising a lamp 8, a parabolic reflector 9, a casing 10 and a hinged door 11, these parts being such as are ordinarily found in headlights, and being here shown for the purpose of illustration only.

In the ordinary operation of my improved lens, most of the light will pass either through the plain or slightly prismatic portions 2 or through the prisms 3 and 4, the rays passing through the prisms being bent downward. Another and smaller portion of the light will pass through the vertical prisms 7 and will be deflected sidewise, while a still further portion of the light will pass through the diffusing area 5 and will serve to illuminate the immediate vicinity of the vehicle.

Another feature of my invention is shown in Figs. 6 and 7 and consists of a screen 12 which, when applied to the front of the headlight, serves to cover the prismatic and diffusing portions of the lens, leaving the portions 2 exposed. The purpose of this screen is to provide for rapid and effective adjustment and focusing of the headlight. The adjustment for direction is accomplished by placing the screen 12 over the headlight, as indicated above, tilting the lamp forward so that the light passing through the plain parts of the lens strikes the desired portion of the road, and then removing the screen. The lens will then properly distribute the portions of the beam which pass through the prisms and the diffusing area.

Another function of the screen 12 is to facilitate the focusing of the lamp 8 with respect to the reflector 9. It has heretofore been customary to focus a headlight lamp by removing the lens, directing the light upon a wall at a suitable distance and then moving the lamp in and out until the desired focus is obtained. This requires some little time and trouble and most drivers of automobiles allow their headlights to remain out of focus. The driver may not even know if his lamp is out of adjustment because ordinary forms of lenses have no means for indicating the condition of the headlight with regard to its focus without taking off the lens.

The plain or simply prismatic areas 2 provide means for indicating whether the lamp is in correct focus or not, and if it is out of focus they indicate when the correct focus has been restored, all without removing the lens from the headlight. The screen 12 obscures all of the main prismatic portions of the lens and the areas 2 are so constructed that when the lamp 8 is in correct focus its two beams will be disposed in predetermined relation with respect to each other. For example, the correct point of focus may be indicated when the two beams passing through the areas 2 are superposed upon the wall on which the beams are thrown. This is the preferred arrangement, although it is entirely possible to so construct the lens that the beams will be found at predetermined distances apart or in predetermined angular relations when the lamp is in focus.

With my improved lens it is a simple matter to determine whether the lamp is in focus, being only necessary to direct the headlight at a wall or the like a convenient distance away and place the screen 12 over the headlight. Only the beams passing through the areas 2 will then be seen and if they are not in the correct relative positions the focus may be quickly adjusted by moving the lamp in and out until the two beams reach their proper positions.

The method of indicating focus by means of two restricted light beams from the headlight depends upon the fact that when the light source in a parabolic reflector is at the focus of the reflector, all of the beams proceed from the headlight in the same direction, or substantially so, so that their projection on a wall, or screen, is a small spot of light. If two restricted bundles of these rays from areas on the lens that are some distance apart, be segregated, with the rest of the beams obscured, these segregated beams will converge and their projected spots will merge if the lamp is at the focus of the reflector, but will diverge if the lamp is either in front or behind its correct position in the reflector. Therefore, a screen having two or more openings will instantly show the focal condition of the headlight if placed over the headlight and will enable the headlight to be adjusted, without removing the lens, by manipulating the lamp with the screen in place until the beams of light escaping through the openings produce superposed light spots, or light spots that are in the proper relative positions. Some lenses require that the lamps be so placed that the beams diverge, others so that the beams converge. In these cases, the lamps are so adjusted that the spots of light are a given distance apart, instead of being superposed.

The restricted light beams may be cast on a wall at a distance of, say fifty feet from the headlight, or if this is not convenient, the light spots may be observed as they fall upon the roadway. In this case the beams of light escaping through the openings in the screen will produce lines or bands of light on the roadway. The relative position of these bands shows the focal condition of the lamp, and the focus is corrected by moving the lamp in or out with respect to the reflector until the bands coincide, or are the proper distance apart.

This method of focusing headlights forms the subject of my copending application for Letters Patent, filed December 17, 1920, Serial No. 430,411.

My improved lenses are preferably packed in sets with a corresponding number of screens, such as the screen 12, so that the purchaser is provided not only with the lens but also with the means for covering the light-modifying portions of the lens, leaving the adjusting portions exposed. This screen may of course be printed in any desired way so as to carry advertisements or directions for the proper adjustment of the headlights to which the lenses are applied.

An essential feature of novelty in my improved lens is the provision, in addition to any light modifying elements that may be desired, of one or more areas which I term "adjusting areas" or "focusing areas" and which are so arranged that the light beams psssing through them produce illuminated areas that present a predetermined appearance when the headlight is in proper condition with respect to focus and direction. Therefore, only one of the adjusting areas may be employed instead of two, as in the modification shown in the drawing, in which case the size and shape of the area are so selected that the illuminated spot produced by the rays passing through the adjusting area of the lens is of a definite and easily recognizable size and shape. I prefer, however, to provide two of these adjusting areas since it is easier to determine the correct relative position of two light spots than the correct size and shape of a single light spot.

In the foregoing description I have referred to the adjusting or focusing areas of the lens as being composed of "plain glass", or as being simply prismatic. The latter expression is to be understood as meaning that these areas, if made prismatic, must be so constructed as to deflect the light by substantially the same amount over the whole focusing area. In such cases the focusing operation is not affected, but if it is attempted to focus a headlight by means of rays passing through a fluted or irregularly prismatic area, as in lenses where flutes and prisms are superposed, the focusing beams escaping through the screen will be so modified that the correct appearance is difficult to recognize.

In the appended claims the term "adjusting" is intended to include either the focusing of the headlight by moving the lamp into the proper relation with the reflector, or the directing of the headlight at the proper inclination with respect to the road.

The screen 12 may be provided with any desired means for temporarily placing it over the headlight, such means consisting, for example, of hooked portions 13. Another simple method of attaching the screen is to provide the screen with a cord or wire near its upper edge, the screen being attached by slipping the cord or wire over the upper edge of the headlight.

While I have shown and described a lens of the flat type, it will be evident that the same principles may be applied equally well to curved lenses. Numerous other changes and modifications may be made in the lens construction herein shown, and it is therefore to be understood that my invention comprehends all such modifications and adaptations as fall within the scope of the appended claims.

The present application is substituted for my prior application for Letters Patent, Serial No. 357,582, filed February 10, 1920.

What I claim is:—

1. A lens comprising a central light-modifying area, a plurality of horizontal prisms disposed above and below the said area, the said prisms varying in length progressively from the said diffusing area, and areas of substantially plain glass disposed beside the said light-modifying area.

2. A lens comprising a rectangular central light-modifying area, vertical prisms formed at the sides of the said area, sectors containing a plurality of horizontal prisms of varying length disposed above and below the said area, and vertical prisms formed at the ends of the said horizontal prisms.

3. A lens comprising a rectangular central light-modifying area, vertical prisms formed at the sides of the said area, a plurality of horizontal prisms disposed above and below the said area, the said horizontal prisms varying in length progressively from the said area and having their ends beveled to form vertical prisms, and areas of substantially plain glass disposed adjacent to the said vertical prisms.

4. A headlight having a lens provided with a plurality of refracting elements and with an area of substantially plain glass, the said headlight being provided with an attachment for adjusting the light comprising a screen shaped to cover the said refracting elements and to leave exposed the said plain-glass area.

5. A headlight comprising a lens having upper and lower sectors provided with light-refracting elements and having substantially plain glass areas at the sides of the said sectors, the said headlight being provided with an attachment for adjusting the light comprising a screen shaped to cover the upper and lower sectors of the said lens leaving the side sectors exposed.

6. A headlight provided with a lens having light refracting elements for normally modifying the emitted light, and also having a restricted adjusting area, said headlight being also provided with means for obscuring all portions of the said lens except the restricted adjusting area, whereby the said headlight may be adjusted as to direction or focus without removing the said lens.

7. A headlight lens set comprising a lens having light refracting elements for normally modifying the emitted light, said lens also having an adjusting area so arranged that the light beam passing through the said area produces an illumination that presents a predetermined appearance when the headlight to which the said lens is applied is properly focused, and a screen adapted to be placed temporarily over the said lens and so shaped as to leave the said adjusting area exposed.

8. A headlight lens set comprising a lens having light refracting elements for normally modifying the emitted light, said lens also having a plurality of adjusting areas so arranged that the light beams passing through the said areas produce illuminations that are in predetermined relative positions when the headlight to which the said lens is applied is properly focused, and a screen adapted to be placed temporarily over the said lens and so shaped as to leave the said adjusting areas exposed.

In testimony whereof, I, the said LARS O. GRONDAHL, have hereunto set my hand.

LARS O. GRONDAHL.

Witnesses:
R. D. BROWN,
JOHN F. WILL.